United States Patent [19]

Horiguchi et al.

[11] Patent Number: 4,849,792
[45] Date of Patent: Jul. 18, 1989

[54] PHOTOSENSITIVE MATERIAL FEEDING APPARATUS USED IN A COPYING MACHINE

[75] Inventors: Masashi Horiguchi; Minoru Yakubo, both of Tokyo, Japan

[73] Assignee: Fuji Photo Film co., Ltd, Kanagawa, Japan

[21] Appl. No.: 181,029

[22] Filed: Apr. 13, 1988

[30] Foreign Application Priority Data

Apr. 13, 1987 [JP] Japan .................................. 62-90503

[51] Int. Cl.⁴ ............................................. C03B 27/58
[52] U.S. Cl. ....................................... 355/72; 354/174
[58] Field of Search ................... 355/27, 50, 51, 72, 355/73; 354/174

[56] References Cited

U.S. PATENT DOCUMENTS

| | | | |
|---|---|---|---|
| 3,580,674 | 5/1971 | Schunck | 355/72 X |
| 3,593,228 | 7/1971 | Miyauchi | 355/73 |
| 3,689,150 | 9/1972 | Nothmann et al. | 355/73 X |
| 3,992,089 | 11/1976 | Hirose et al. | 355/73 X |
| 4,042,300 | 8/1977 | Spence-Bate | 354/174 X |
| 4,089,017 | 5/1978 | Buldini | 354/174 X |
| 4,161,364 | 7/1979 | Hanai et al. | 355/72 |
| 4,774,547 | 9/1988 | Uchida et al. | 355/27 |

Primary Examiner—Richard A. Wintercorn
Attorney, Agent, or Firm—Sughrue, Mion, Zinn, Macpeak & Seas

[57] ABSTRACT

An apparatus for feeding a photosensitive material to an exposure station of a copying machine which makes copies on the photosensitive material from various originals. The apparatus includes at least two magazines, each of which is detachably mounted on the copying machine; at least two photosensitive materials having different sensitivities contained in the magazines, respectively; and a magazine selector for selecting one of the magazines according to the type of original. The magazine selector includes an automatic classifying device for classifying various originals into at least two types.

9 Claims, 5 Drawing Sheets

PHOTOSENSITIVE MATERIAL FEEDING APPARATUS USED IN A COPYING MACHINE

FIELD OF THE INVENTION

The present invention relates to a photosensitive material feeding apparatus for use in a silver salt type copying machine. More particularly, the invention relates to a photosensitive material feeding apparatus for selectively feeding different types of photosensitive materials contained in respective magazines mounted on the copying machine according to the type of original.

BACKGROUND OF THE INVENTION

Generally, an original from which copies are to be made by a silver salt type copying machine is classified into two groups. The first group contains printed originals and photographic originals, and the original is classified into this group by determining the materials contained on the original. The second group contains high contrast originals and half tone originals, and the original is classified into this group by determining the image quality of the original. Regarding the first group of originals, because of the use of inks contained in the printed originals and of dyes contained in the photographic originals, the printed and photographic originals have different spectral reflection densities. Regarding the second group of originals, the high contrast originals often include letters and line drawings in which contrast is considered to be important. In the half tone originals, gradation is considered to be important.

Although originals have different image characteristics, the silver salt type of copying apparatus conventionally uses the same type of photosensitive material for copying all of the different types of originals. As a result, poor quality copies result for various types of originals.

OBJECT OF THE INVENTION

It is, therefore, an object of the present invention to provide a photosensitive material feeding apparatus for use in a silver salt type copying apparatus in which a suitable photosensitive material is selected according to the type of original.

SUMMARY OF THE INVENTION

The present invention accomplishes this and other objects by providing a photosensitive material feeding apparatus, comprising: at least two different types of photosensitive material, each of which is contained in a magazine mounted on a copying apparatus; means for classifying originals from which copies are to be made into at least two groups; and means for selectively withdrawing one of the different types of photosensitive materials from the magazines according to the classified original.

According to a preferred embodiment of the present invention, different types of photosensitive materials having different spectral photosensitivities are contained in respective magazines of the copying apparatus. The original from which a copy is to be made is first examined either automatically, or visually, and then classified into either a color printed original, or a photographic original. According to the result of the classification, an appropriate one of the magazines is selected, and then withdrawing means is activated to withdraw the photosensitive material contained within the selected magazine.

BRIEF DESCRIPTION OF THE DRAWINGS

This invention will be described by way of a preferred embodiment with reference to the accompanying drawings, wherein.

DETAILED DESCRIPTION OF THE INVENTION

Figure 1:
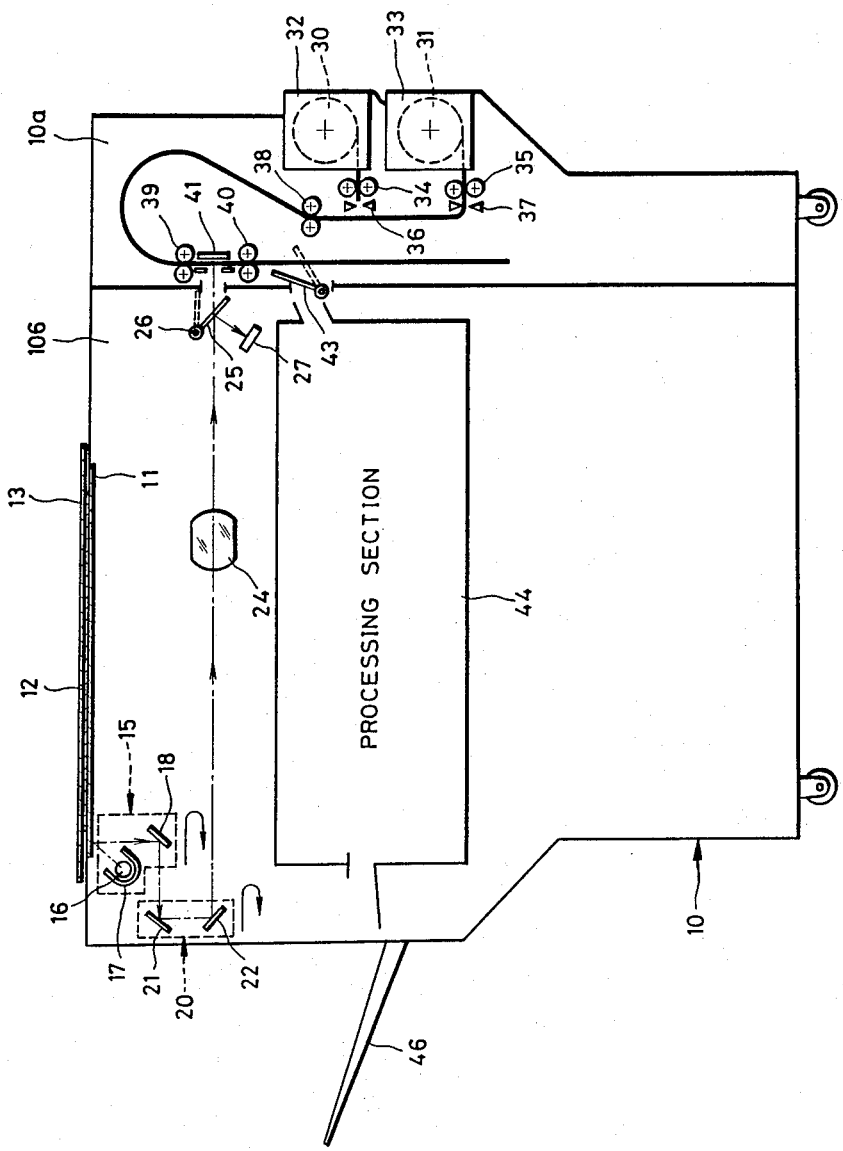
FIG. 1 is a fragmentary schematic view of a silver salt type copying apparatus embodying the present invention.

FIG. 1 shows a silver salt type color copying machine 10 embodying the present invention. In FIG. 1, the color copying machine 10 includes a housing, wherein an exposure section 10a and a processing section 106 are formed. A transparent table 11, located on the top of the processing section 106, serves as a support for a color original 12. A cover 13, located over the transparent table 11, contains an inner white surface for covering the color original.

A movable illumination light unit 15, located under the transparent table 11, contains an illumination lamp 16, a reflector 17, and a mirror 18. The illumination light unit 15 serves to scan the original 12 by moving back and forth in a parallel direction to the transparent table, thereby illuminating the color original 12 with a light beam or a line of illumination. A mirror unit 20 contains a pair of mirrors 21 and 22 which are arranged to face each other at a right angle. The mirror unit 20 is synchronized with the illumination light unit 15 such that the mirror unit 20 moves back and forth at one-half ($\frac{1}{2}$) of the illumination light unit speed, thereby reflecting light from the color original 12. More particularly, reflected light from the color original 12 is applied to mirror 22 through mirror 18 and mirror 21.

The light applied to mirror 22 is then reflected through a lens 24 to a pivotable mirror shutter 25 which pivots about a pivot shaft 26. The pivot shaft 26 pivots to either a first position (indicated by solid lines) or to a second position (indicated by dotted lines), and serves to direct the reflected light to either a light measuring means 27, or to an exposure stage 41, respectively.

The exposure chamber 10a, includes at least two magazines 32 and 33, each of which are removably mounted thereon. The magazines 32 and 33 contain photosensitive material sheets 30 and 31, respectively. Since the magazines 32 and 33 contain photosensitive material, each magazine is "light-proof", i.e., the magazines are designed such that no ambient light can impinge upon the photosensitive material contained therein. Each of the photosensitive materials contains a different gamma value. For example, the magazine 32 contains a rolled sheet of photosensitive material 30 suitable for copies of color photographic originals, whereas the magazine 33 contains a rolled sheet of photosensitive material 31 suitable for copies of color printed originals. Located in front of each of the magazines 32 and 33 is a pair of withdrawing rollers 34 and 35, respectively. These pairs of rollers 34 and 35 are selectively actuated to withdraw the respective photosensitive material out of either magazine 32 or 33. In front of each of the withdrawing rollers 34 and 35 is located a cutter 36 and 37, respectively, each of which serves to cut the respective photosensitive material 30, 31 to a predetermined length of the photosensitive material sheet.

After one of the photosensitive material 30, 31 is withdrawn from the magazine 32, 33, it is cut, and then the cut sheet is transported upwardly along a looped guide member (not shown) by a pair of feed rollers 38 to a pair of conveyor rollers 39. Located below the conveyor rollers 39 is another pair of conveyor rollers 40. Located between the pairs of conveyor rollers 39 and 40, is an exposure station 41. When making a color copy of the original, the selected photosensitive material sheet is transported downwardly through the exposure station 41 at a constant speed by the pairs of conveyor rollers 39 and 40.

A pick up member 43, located below the exposure station 41, is movable between a first and a second position shown by solid and dotted lines, respectively. When the pick up member 43 is placed in the second position, it serves to pick up the leading end of the selected photosensitive material sheet 30, or 31, and to introduce the sheet into a processing chamber 44. In the processing chamber 44, the photosensitive material sheet is first processed in a well known manner, and then ejected onto a tray 46.

Figure 2:
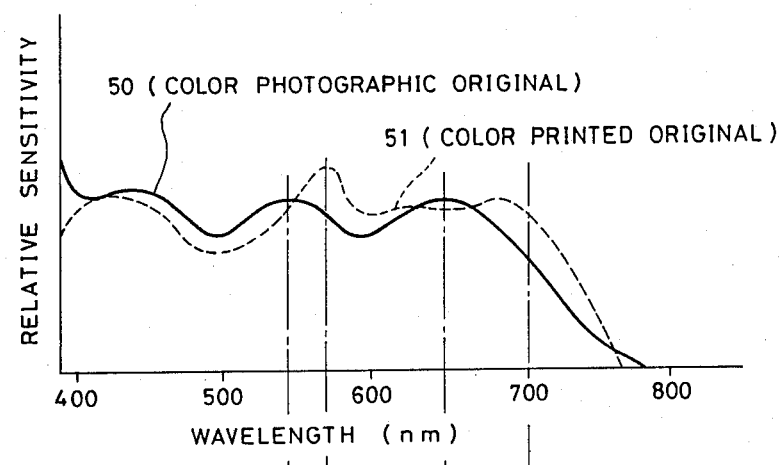
FIG. 2 is a graph showing spectral reflection densities of color photographic originals, and color printed originals.

Reference is now made to FIG. 2, which shows the respective spectral reflection density distributions of color photographic originals and of color printed originals, both of which have ordinary color balances. In FIG. 2, the spectral reflection density distribution of color photographic originals is shown by a distribution curve 50, and the spectral reflection density distribution of color printed originals is shown by a distribution curve 51.

Color photographic originals contain magneta dye and cyan dye, whereas color printed originals contain magneta ink and cyan ink. The color photographic original curve 50 shows the magenta dye having a peak reflection density at a wavelength between 530 and 560 nm, which corresponds to green light, whereas curve 50 shows the cyan dye having a peak reflection density at a wavelength of approximately 650 nm, which corresponds to red light. As shown in FIG. 2, both of these dyes show a rapid decrease of reflection density above and below their respective peak wavelengths.

On the other hand, magenta inks used in color printed originals have a peak reflection density at a wavelength of approximately 570 nm, which corresponds to green light, and cyan inks have a spectral reflection density distribution which is relatively constant or flat over a wavelength range between 600 and 700 nm. In addition, the relative sensitivity of cyan ink used in color printed originals changes more rapidly than the relative sensitivity of cyan dye used in color photographic originals for wavelengths longer than 700 nm.

As described above, color photographic and color printed originals exhibit different peak reflection densities at different wavelengths. On the basis of this fact, various color originals can be classified into two different types, namely color photographic originals, and color printed originals. More particularly, the classification can be accomplished by using two light sensors, each having sensitivity peaks at different wavelengths within the same wavelength range. The color originals may be classified by detecting either the original's spectral reflection densities or spectral light intensities.

Figure 3:
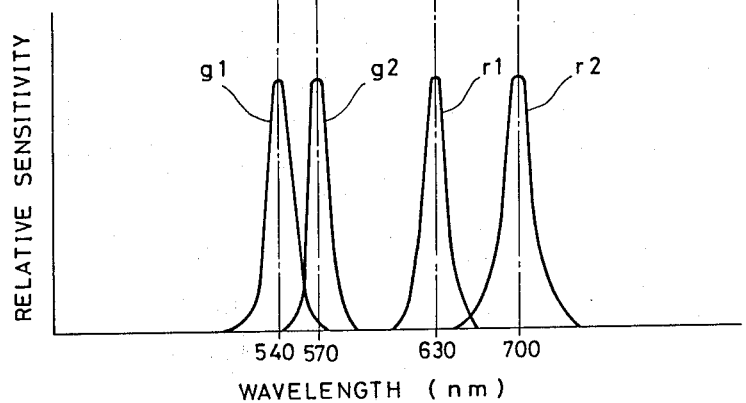
FIG. 3 is a graph showing spectral sensitivities of of light sensors used in the invention.

For detecting reflection densities of color originals, two sets of light sensors, each set having first and second light sensors, are used to detect green and red lights, respectively. As shown in FIG. 3, green light is detected by the first and second light sensors 27a and 27b (FIG. 4) having relative peak sensitivities shown by curves g1 and g2 at wavelengths of 540±15 nm and 50±15 nm, respectively. On the other hand, red light is detected by the first and second light sensors 27c and 27d (FIG. 4) having relative peak sensitivities shown by curves r1 and r2 at wavelengths of 630±40 nm and 680±40 nm, respectively. If the first light sensor for red has its peak sensitivity at a wavelength of 650±20 nm or of 610±20 nm, it is desirable to make the second light sensor for red have a peak sensitivity at a wavelength of 700±20 nm or 660±20 nm, respectively.

Figure 4:
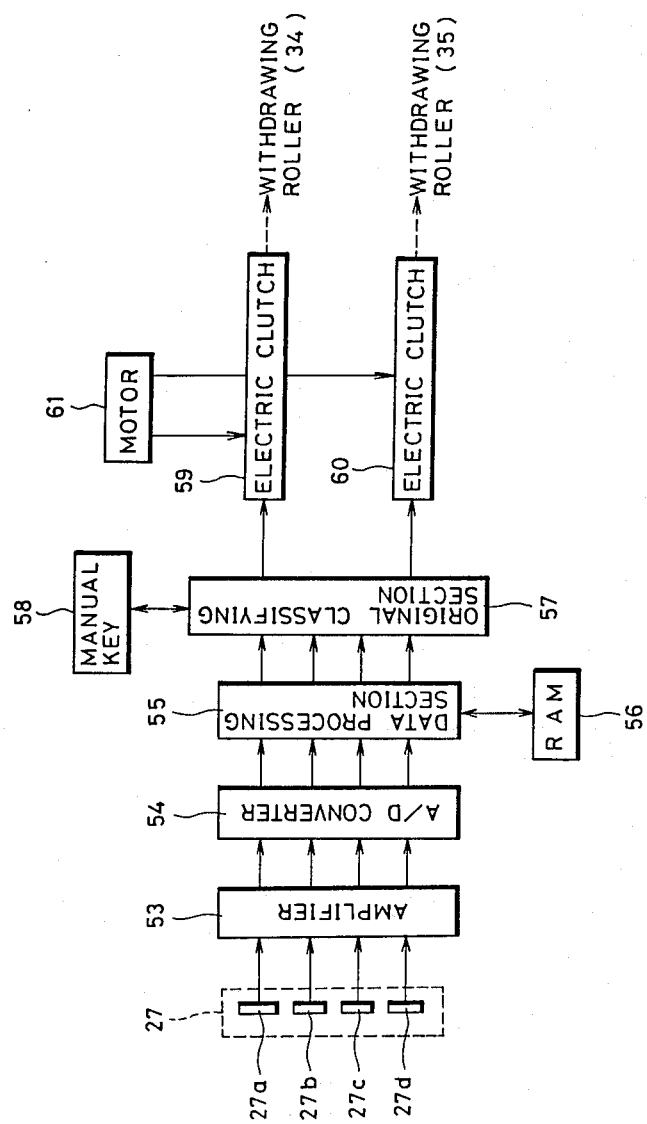
FIG. 4 is a block diagram of a circuit for selecting different types of photosensitive materials.

FIG. 4 shows a circuit for automatically classifying originals based on their green and red reflection densities. In FIG. 4, the color original is repeatedly scanned by the light measurement means 27 which contains the four light sensors 27a-27d. The light sensors 27a-27d serve to detect reflection densities for two colors, namely green and red. The density signals from the respective light sensors 27a to 27d are supplied to an amplifier 53 which amplifies the density signals. The amplified density signals are then converted into digital signals by an A/D converter 54. These four digital density signals are then sent to a RAM 56 through a data processing section 55. After the scanning of the original is completed, the data processing section 55 reads out and compares two density signals for each color. According to the result of the comparisons, the color original classification section 57 classifies the color original 12 into either a color printed original, or a photographic original. Based on the result of the classification, one of the two electric clutches 59, 60 is selectively energized, thereby coupling a motor 61 to one of the two pairs of withdrawing rollers 34 and 35. Connected to the color original classification section 57 is a manual classification key 58 by which the color original 12 is designated to be a color printed original or a photographic original based on the above-described inspection of the original.

Figure 5:
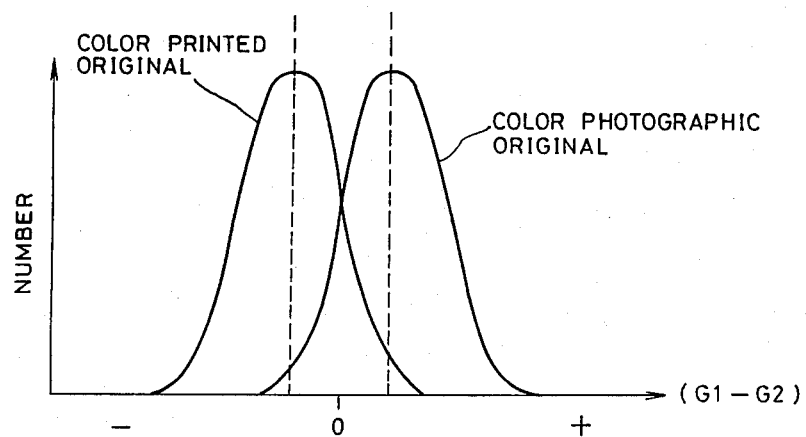
FIG. 5 is a graph showing distributions of density differences for color photographic originals and color printed originals.

In determining the classification of a color original, the difference between two densities for one color, for example green, are compared. More specifically, green densities $G1_i$ and $G2_i$ are detected by the respective light sensors 27a and 27b for each division (i) of the color original 12. The graph of FIG. 5 shows the density difference between G1 and G2 (i.e. G1−G2) for color printed originals and color photographic originals. According to the density difference between G1 and G2, the color original is determined to be either a color printed original, or a color photographic original.

Figure 6:
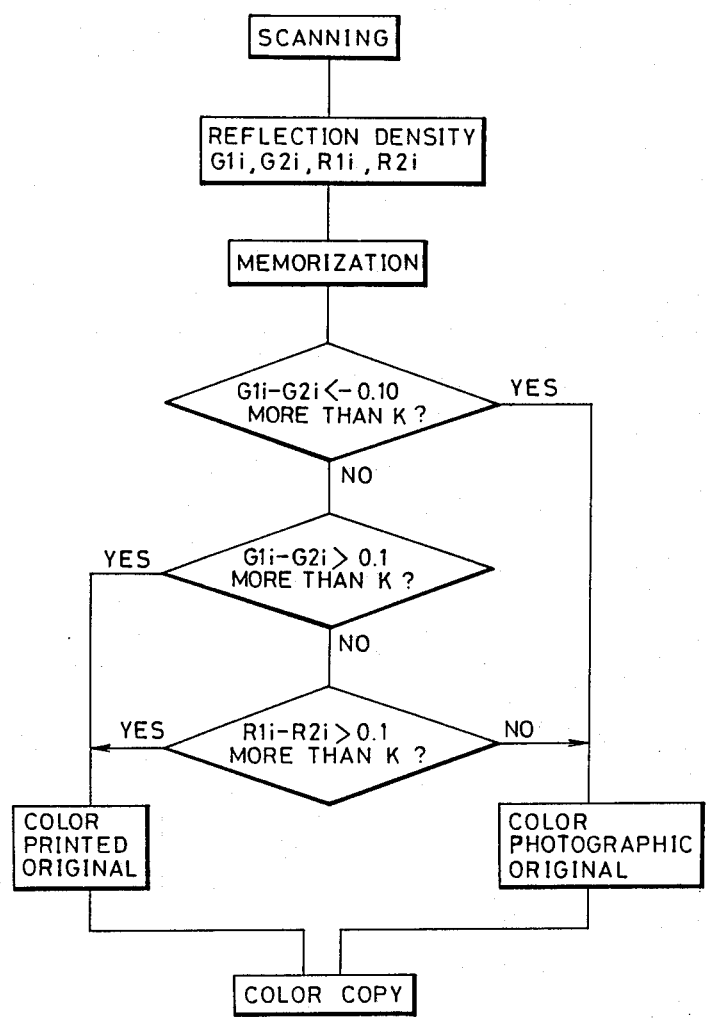
FIG. 6 is a flow chart showing a sequence for classifying color originals.

FIG. 6 is a flow chart showing a sequential process for classifying color originals by using four color densities. In FIG. 6, the color original 12 is first scanned to detect four reflection densities for each division (i) of the color original. The detected reflection densities $G1_i$, $G2_i$, $R1_i$ and $R2_i$ are then memorized in RAM 56 (FIG. 4). After scanning all of the divisions of the color original 12, green densities $G1_i$ and $G2_i$ are read out and compared using the following condition (1):

$G1_i - G2_i < -0.10$ (1)

If the number of divisions satisfying the above condition (1) is greater than a predetermined number K, then the color original is classified as being a color photographic original. The predetermined number K is a consant, and may, for example, be equal to 20% of the total number of divisions into which the color original is divided.

If, on the other hand, the number of divisions satisfying the condition (1) is less than K, then the color original is further examined by using the following condition (2):

$G1_i - G2_i > 0.1$ (2)

If the number of divisions satisfying the above condition (2) is greater than K, then the color original is classified as being a color photographic original.

If the number of divisions satisfying condition (2) is less than K, then the color original is an again examined, this time by using the following condition (3):

$R1_i - R2_i > 0.1$ (3)

If the number of divisions satisfying condition (3) is greater than K, then the color original is classified as being a color printed original. If the number of divisions satisfying condition (3) is less than K, then the original is classified as being a color photographic original.

A detailed explanation of the operation of the color copying apparatus 10 of FIG. 1 will now be described. After placing the color original 12 on the transparent table 11, the copying key (not shown) is operated to start the scanning of the color original 12. More particularly, the illumination light unit 15 is activated to move simultaneously with the mirror unit 20. The slit line of light emanating from the lamp 16 is reflected by the color original 12, and directed to the mirror shutter 25 through the mirrors 18, 21 and 22 and the lens 24. The mirror shutter 25 reflects the slit line of light to the light measurement means 27. The light measurement means 27 includes the light sensors 27a–27d (FIG. 4), and provides four respective density outputs. As discussed in connection with FIG. 4, these outputs are stored or memorized in RAM 56 after being subjected to amplification, digital conversion and logarithmic transformation. As a result, RAM 56 contains two green density signals, and two red density signals for each division of the color original 12.

After the scanning is completed, the illumination light unit 15 and the mirror unit 20 are returned to their initial positions shown in FIG. 1. Simultaneously, the data processing section 57 (FIG. 4) reads out four density signals for each division of the original from RAM 56 to classify the color original 12 according to the sequential process shown in FIG. 6.

When the color original 12 is determined to be a color photographic original, the electric clutch 59 (FIG. 4) is energized. On the other hand, when the color original 12 is determined to be a color printed original, the electric clutch 60 is energized. After one of the electric clutches 59 and 60 is energized, the motor 61 withdraws a photosensitive material suitable for the classified color original 12. For example, if the color original 12 is a color photographic original, the withdrawing rollers 34 (FIG. 1) is rotated to withdraw the photosensitive material 30 from the magazine 32 by a predetermined length. The cutter 36 is then actuated to cut off the photosensitive material 30 after a predetermined length has passed through, thereby providing a photosensitive material sheet for copying the photographic original. On the other hand, if the color original is classified as being a color printed original, the photosensitive material 31 is withdrawn by the rollers 35 from the magazine 33, and cut off by the cutter 36.

In either case, the photosensitive material sheet is transported by the feed rollers 38 and is bit or nipped by the upper conveyor rollers 39. As soon as the photosensitive material sheet is bit by the conveyor rollers 39, the illumination light unit 15 and the mirror unit 20 starts to scan the color original 12. When a predetermined amount of time after the start of scanning has elapsed, the mirror shutter 25 is removed from the optical path to allow the reflected light from the original to impinge upon the selected photosensitive material sheet, thereby exposing the selected photosensitive material with a slit line of light from the color original 12. During the exposure, the selected photosensitive material sheet is bit by the conveyor rollers 39 and 40 such that the photosensitive material is maintained flat over the exposure station 41.

During exposure, a latent image of the color original 12 is created on the photosensitive material sheet. In order for one scanned line of the original to correspond to a respective line of the photosensitive material, the photosensitive material is transported at the same speed as the illumination light unit 15. In order to prevent the photosensitive material sheet from slipping between the conveyor rollers 39 and 40 due to a change of load exerted on the photosensitive material sheet, the photosensitive material sheet is transported downwardly so as to receive a constant load.

When it is detected that the illumination unit has reached a predetermined position, the mirror shutter 25 is moved into the optical path between lens 24 and exposure station 41 to finish exposure. Thereafter, the illumination light unit 15 and the mirror unit 20 are returned to their initial positions shown in FIG. 1. Simultaneously, the direction of rotation of the conveyor rollers 39 and 40 are reversed such that the exposed photosensitive material sheet moves upwards until the trailing end of the photosensitive material sheet reaches the conveyor rollers 40. The pick up member 43 then moves to a position shown by the dotted lines in FIG. 1, and the direction of rotation of the conveyor rollers 39 and 40 are again reversed such that they rotate in their normal direction, thereby transporting the photosensitive material sheet downwards. Consequently, the pick up member 43, which is now in the position shown by dotted lines, introduces the leading end of the photosensitive material sheet into the processing section 44. In the processing section 44, the photosensitive material sheet is processed and then ejected into the tray 46.

As is well known, copies of letters and/or line drawings are required to have a high contrast, whereas half tone copies are required to have a sharp gradation. In making these copies, two magazines including photosensitive materials having different gamma values are loaded on the copying apparatus. These different photosensitive materials may be selected either by using the manual selection key as a result of visual examination or by using the automatic classification means based on an image characteristic value obtained by the scanning of the color original.

Although in the above-described embodiment two different photosensitive materials were used, it should be understood that more than two different photosensitive materials may be used, thereby allowing a greater selection of photosensitive materials for a classified original. It is also possible to use diffusion transfer photographic materials such as negative and positive photosensitive materials or thermal transfer photosensitive materials in place of the direct positive photosensitive materials. In these cases, a plurality of negative photosensitive materials are selectively used to create a latent image therein and superimposed on one type of positive photosensitive materials to form the positive image thereon.

It will be apparent to those skilled in the art that various changes and modifications may be made without departing from the scope and spirit of the invention. It should be understood that the invention is limited only by the scope of the following claims.

What is claimed is:

1. An apparatus for feeding photosensitive material to an exposure station of a copying machine which makes copies on the photosensitive materials from originals, the apparatus comprising:

at least two magazines detachably mounted on the copying machine;

at least two photosensitive materials having different photographic characteristics contained in said magazines, respectively; and means for selecting said at least two magazines according to groups into which the originals are classified to withdraw and feed a photosensitive material contained in said selected magazine to the exposure station.

2. An apparatus as defined in claim 1, wherein said at least two photosensitive materials have different spectral sensitivities.

3. An apparatus as defined in claim 2, wherein said originals are classified into one of a color printed original and a color photographic original.

4. An apparatus as defined in claim 1, wherein said at least two photosensitive materials are a soft gradation material selected for half tone originals, and a hard gradation material selected for originals having one of letters and line drawings.

5. An apparatus as defined in claim 1, wherein said means includes automatic classifying means for classifying the originals by detecting reflection densities of each of the originals.

6. An apparatus as defined in claim 5, wherein said means includes withdrawing means associated with each of said magazines for withdrawing said photosensitive materials, a motor, and a pair of electric clutches disposed between said motor and said pair of withdrawing means, said electric clutches being actuated to selectively couple said withdrawing means to said motor based on the classification of the original, thereby selecting one of said two magazines.

7. An apparatus for feeding photosensitive material to an exposure station of a copying machine which makes a copy of the photosensitive material from an original, the apparatus comprising:

at least two magazines detachably mounted on the copying machine, each of said at least two magazines containing a photosensitive material, and each photosensitive material having a different gamma value;

means for classifying the original according to its spectral reflection density; and means for supplying one of said photosensitive materials to the exposure station according to the classified original.

8. The apparatus as defined in claim 7, wherein said classifying means includes a plurality of sensors for detecting peak reflection densities of the original.

9. The apparatus defined in claim 8, wherein said classifying means further includes means for comparing outputs of said sensors, and for classifying the original according to the compared outputs.

* * * * *